United States Patent
Evans

(10) Patent No.: US 10,057,080 B2
(45) Date of Patent: Aug. 21, 2018

(54) MULTICAST TRANSMISSION OVER BONDED BROADBAND

(71) Applicant: SHARED BAND LIMITED, Ipswich, Suffolk (GB)

(72) Inventor: Paul Andrew Evans, Ipswich (GB)

(73) Assignee: Shared Band Limited, Ipswich, Suffolk (GB)

( * ) Notice: Subject to any disclaimer, the term of this patent is extended or adjusted under 35 U.S.C. 154(b) by 143 days.

(21) Appl. No.: 15/031,093

(22) PCT Filed: Oct. 20, 2014

(86) PCT No.: PCT/GB2014/053131
§ 371 (c)(1),
(2) Date: Apr. 21, 2016

(87) PCT Pub. No.: WO2015/059456
PCT Pub. Date: Apr. 30, 2015

(65) Prior Publication Data
US 2016/0269192 A1    Sep. 15, 2016

(30) Foreign Application Priority Data
Oct. 24, 2013  (GB) .................................. 1318835.4

(51) Int. Cl.
*H04J 3/04* (2006.01)
*H04L 12/28* (2006.01)
(Continued)

(52) U.S. Cl.
CPC ........ *H04L 12/2863* (2013.01); *H04L 12/184* (2013.01); *H04L 45/16* (2013.01);
(Continued)

(58) Field of Classification Search
USPC ....... 370/229, 252, 464, 535, 536, 537, 538, 370/539, 540, 542, 543, 544
See application file for complete search history.

(56) References Cited

U.S. PATENT DOCUMENTS

| | | | |
|---|---|---|---|
| 8,411,696 B1 * | 4/2013 | Ko ...................... | H04L 12/2861 370/386 |
| 9,742,905 B1 * | 8/2017 | Schneider ............. | H04M 3/007 |

(Continued)

FOREIGN PATENT DOCUMENTS

| | | |
|---|---|---|
| EP | 1851976 | 11/2007 |
| EP | 2619946 | 7/2013 |

(Continued)

OTHER PUBLICATIONS

EPO Search Report in Application GB1318835.4, dated Apr. 14, 2014, EPO.

(Continued)

*Primary Examiner* — Kwang B Yao
*Assistant Examiner* — Nguyen Ngo

(57) ABSTRACT

Implementing multicast transmission over bonded broadband provides a communication network comprising a plurality of routers having the ability to route multicast streams: a multicast stream splitter receiving a multicast stream and arranged in operation to split the multicast stream into a plurality of multicast sub-streams and to transmit the plurality of multicast streams. The plurality of routers receive the multicast sub-streams and replicate them in dependence upon downstream routers subscribed to the sub-streams. One or more bonding routers serve a single customer serving a plurality of fixed or wireless broadband connections having a respective capacity. Each bonding router subscribes to one or more of the plurality of multicast sub-streams in dependence upon the respective capacity of the plurality of connections; wherein the one or more bonding routers (Continued)

serving a single customer aggregate the plurality of multicast sub-streams to form a single multicast stream for use by the customer.

10 Claims, 5 Drawing Sheets

(51) Int. Cl.
    *H04L 29/06*     (2006.01)
    *H04L 12/18*     (2006.01)
    *H04L 12/761*     (2013.01)
    *H04L 12/863*     (2013.01)

(52) U.S. Cl.
    CPC ...... *H04L 47/6225* (2013.01); *H04L 65/4076* (2013.01); *H04L 65/605* (2013.01); *H04L 65/80* (2013.01)

(56) References Cited

U.S. PATENT DOCUMENTS

| | | | | |
|---|---|---|---|---|
| 2004/0034712 A1* | 2/2004 | Rajwan | ................ | H04L 1/0002 709/231 |
| 2007/0143468 A1* | 6/2007 | Serenyi | ................ | H04L 29/06 709/223 |
| 2010/0287274 A1 | 11/2010 | Martinez et al. | | |
| 2013/0149792 A1* | 6/2013 | Bradwell | ............ | G01N 33/574 436/501 |
| 2013/0268984 A1* | 10/2013 | Salinger | ................ | H04L 47/806 725/109 |
| 2013/0315080 A1* | 11/2013 | Diab | ................ | H04L 12/12 370/252 |
| 2015/0095454 A1* | 4/2015 | Shang | ................ | H04N 21/2381 709/217 |
| 2015/0139287 A1* | 5/2015 | Chef | ................ | H04L 5/1438 375/222 |

FOREIGN PATENT DOCUMENTS

| | | |
|---|---|---|
| GB | 2404816 | 2/2005 |
| WO | WO 2012177763 | 12/2012 |

OTHER PUBLICATIONS

International Search Report for PCT Application, PCT/GB2014/053131, dated Jan. 21, 2015, EPO.

International Search Report and Written Opinion for PCT/GB2014/053131, dated Jan. 21, 2015, EPO.

Sharedband Technology Briefing, White Paper, Mar. 2012.

* cited by examiner

MULTICAST TRANSMISSION OVER BONDED BROADBAND

BACKGROUND a. Field of the Invention

This invention relates to implementing multicast transmission over bonded broadband. Broadband bonding refers to the aggregation of broadband channels such as multiple fixed and or/wireless channels to provide an aggregated channel with a corresponding higher bandwidth. Multicast refers to the transmission of data to a group of destination computers simultaneously in a single transmission from the source.

In this description reference is made to the OSI seven layer protocol stack summarised briefly in the table below. The terms packets and datagrams are used interchangeably in this application.

| Layer | Name | Function |
|---|---|---|
| 1. | Physical | A not necessarily reliable direct point-to-point data connection. |
| 2. | Data link | A reliable direct point-to-point data connection. |
| 3. | Network | Addressing, routing and not necessarily reliable delivery of datagrams/packets between points on a network. |
| 4. | Transport | Reliable delivery of datagrams/packets between points on a network. |
| 5. | Session | Interhost communication, managing sessions between applications |
| 6. | Presentation | Data representation, encryption and decryption, convert machine dependent data to machine independent data |
| 7. | Application | Network process to application | b. Related Art

In multicast datagram transmission copies of datagrams/packets are automatically created in network elements, such as routers when the topology of the network requires it. Internet Protocol (IP) multicast is often employed in applications such as streaming media and Internet Protocol Television (IPTV). The implementation of the multicast concept occurs at the network layer, where routers create optimal distribution paths for streams of datagrams/packets sent to a multicast destination address.

Broadband bonding can occur at any layer, but when it occurs at the network layer or above it is not a simple matter to support multicast services. When bonding at lower level in the protocol stack, for example at the data link layer or the physical layer, it is possible to deliver multicast services over them because a bonded link appears as a single virtual connection to the network layer protocol.

However for bonding solutions above the data link layer, a multicast stream would typically be received at an aggregation server (or equivalent), and packets within the stream would be sent on a round-robin basis to an end user's routers, then aggregated at the other end, again as a multicast stream. The problem with this approach is even though a multicast stream is sent out on the customer local area network, no network layer multicast capability is utilised, essentially unicast packets are sent and no multicast efficiencies are achieved.

There is a need for a method of sending a multicast stream over bonded broadband lines without losing the efficiencies of multicast due to the bonding employed.

SUMMARY OF THE INVENTION

According to the invention there is provided a communication network comprising a plurality of routers having the ability to route multicast streams: a multicast stream splitter receiving a multicast stream and arranged in operation to split said multicast stream into a plurality of multicast sub-streams and to transmit said plurality of multicast streams; said plurality of routers receiving said multicast sub-streams and replicating said sub-streams in dependence upon downstream routers subscribed to said sub-streams; one or more bonding routers serving a single customer said one or more bonding router serving a plurality of fixed or wireless broadband connections having a respective capacity, each bonding router subscribing to one or more of said plurality of multicast sub-streams in dependence upon the respective capacity of the plurality of connections; wherein the one or more bonding routers serving a single customer aggregate said plurality of multicast sub-streams to form a single multicast stream for use by said customer.

Preferably a plurality of bonding routers serve a single customer each of said plurality of bonding routers serving a fixed or wireless broadband connection having a respective capacity, each bonding router subscribing to one or more of said plurality of multicast sub-streams in dependence upon the respective capacity of the connection served by that bonding router; wherein the plurality of bonding routers serving a single customer co-operate to aggregate said plurality of multicast sub-streams to form a single multicast stream for use by said customer.

In one embodiment said multicast stream splitter is arranged to split the received multicast stream into a plurality of substreams by allocating received packets to sub-streams sequentially on a round robin basis. In another embodiment said multicast stream splitter is arranged to split the received multicast stream into a plurality of substreams by allocating received packets to each substream in turn until a respective threshold has been met for the substream currently having packets allocated. In a third embodiment said multicast stream splitter is arranged to allocate keyframe packets to a particular substream.

In one embodiment said one or more bonding routers are arranged to subscribe to one or more of said plurality of multicast sub-streams in response to a message from the multicast stream splitter. The message may specify that the bonding routers should subscribe to sequential multi cast sub streams.

Alternatively the message may specify that the bonding routers should subscribe to non-sequential multi cast sub streams.

It is advantageous if in the event a bonding router is unable to receive a plurality of multicast streams the bonding router is arranged to receive a unicast version of the plurality of multicast streams to which it is subscribed.

BRIEF DESCRIPTION OF THE DRAWINGS

The invention will now be described, by way of example only, with reference to the accompanying drawings, in which.

DETAILED DESCRIPTION

Broadband bonding is used to combine the upstream and downstream capacity of multiple connections into a single virtual connection. For example two 2 Mbps download, 250 kbps upload Asymmetric Digital Subscriber Lines (ADSLs) could be combined to provide up to a 4 Mbps download, 500 kbps upload connection.

Figure 1:
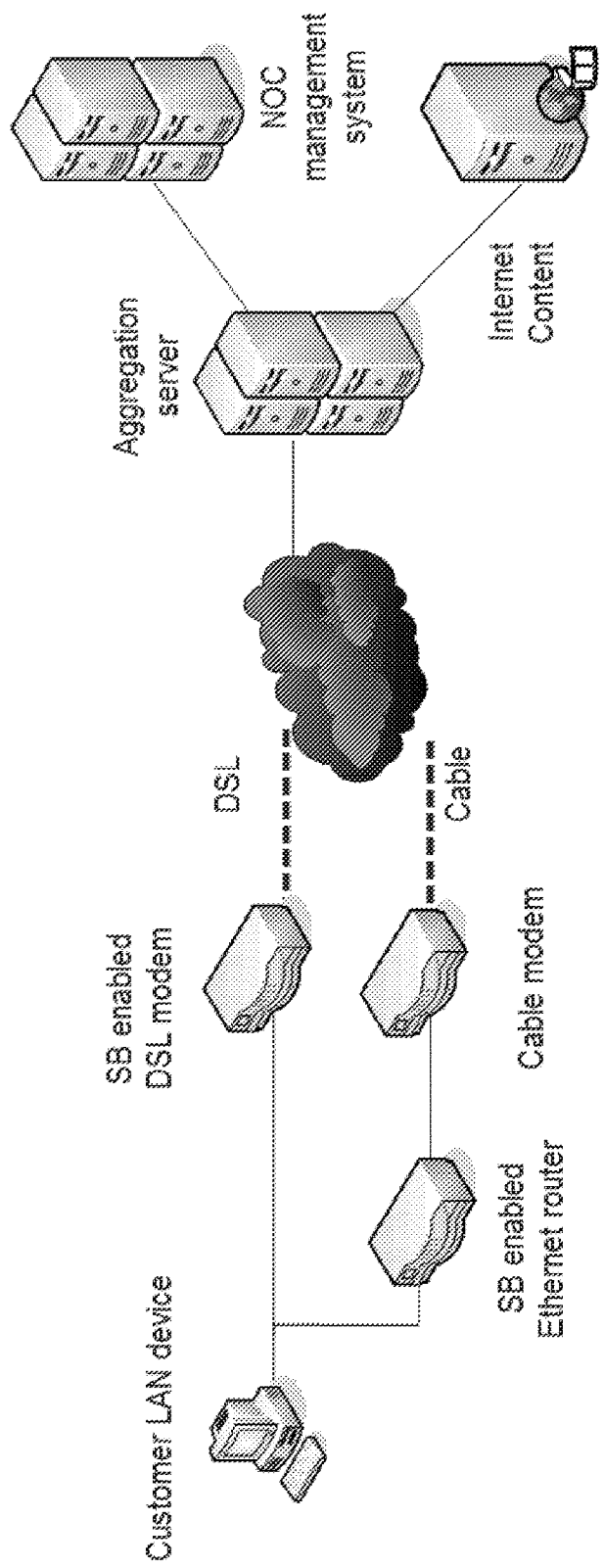
FIG. 1 illustrates a device using broadband bonding.

FIG. 1 illustrates a network using broadband bonding. Broadband bonding seamlessly combines multiple broadband pipes into single virtual pipe and can use almost any physical layer connection type such as Digital Subscriber Lines (DSLs), cable, satellite, Bell Labs Transmission System 1 (T1), mobile broadband (3G/4G) to name but a few. A customer local area network device 10 connects to a communications network (eg the Internet) 15 via bonding enabled routers 11,12, which in practice are provided by a firmware upgrade to low-cost commodity routers from standard providers such as Linksys, D-Link or Netgear. For example, the device 10 may connect via a bonding enabled Ethernet router 11 (and cable modem 13) and via a bonding enabled digital subscriber line (DSL) modem 12. In an alternative embodiment a single bonding router with multiple network interfaces may be used. Upload and download data is sent via an aggregation server 16 which provides the public IP address and compensates for different line speeds and latencies. A network operations centre (NOC) management system 17 and Internet content server 18 are also illustrated.

Broadband bonding can operate in a number of different modes: In simple bonding mode the capacity of multiple lines is combined into a single virtual connection; in failover mode multiple lines are bonded onto a single virtual connection but if they fail traffic is seamlessly routed over a backup line; in overflow/speed boost mode a second line is only used when the primary is full and/or there is an application need.

In simple bonding mode packets are distributed over the multiple connections based upon the relative speeds of the connection. For example connections with an equal speed would have an equal number of packets sent down each; however one 3 Mbps connection will have three times the packets sent to it as compared to a 1 Mbps connection (assuming packets of equal size).

Multicast over bonded broadband is implemented using a multicast splitter server (MSS) which subscribes to multicast streams specified by the NOC. This will be described later in more detail with reference to FIG. 2. The MSS splits the received multicast stream into a plurality of multicast sub-streams. Bonding routers are arranged to subscribe to a subset (or all) of the sub-streams. The Internet Group Management Protocol (IGMP) is used to establish multicast group memberships. The terms subscribing to a stream/group/address, joining a stream/group/address or requesting membership of a stream/group/address all mean the same.

The multicast stream is split into a plurality of substreams for example, 16 streams each has $\frac{1}{16}$ of the packets (assuming the packets are all equal size, if the packets are different sizes from one another then different ratios would be used). Then depending upon the relative speed of the connections served by each bonding router, each bonding router will subscribe to an appropriate proportion of the substreams. For example a customer has a 4 Mbps and 12 Mbps line—the first router would subscribe to a quarter of the substreams, the second router will subscribe to the remaining three quarters of the substreams.

This results in an optimum bonding of lines which can change in near real-time depending upon network conditions whilst keeping the efficiencies of the underlying multicast network. The more streams the original multicast stream is split into, the more optimum the balancing of the sub streams between bonding routers. For example if the original multicast stream is split into just two substreams then in the above example each bonding router would subscribe to one substream and the balancing would not be as effective as it would be if the original multicast stream were to be split into more substreams.

Figure 2:
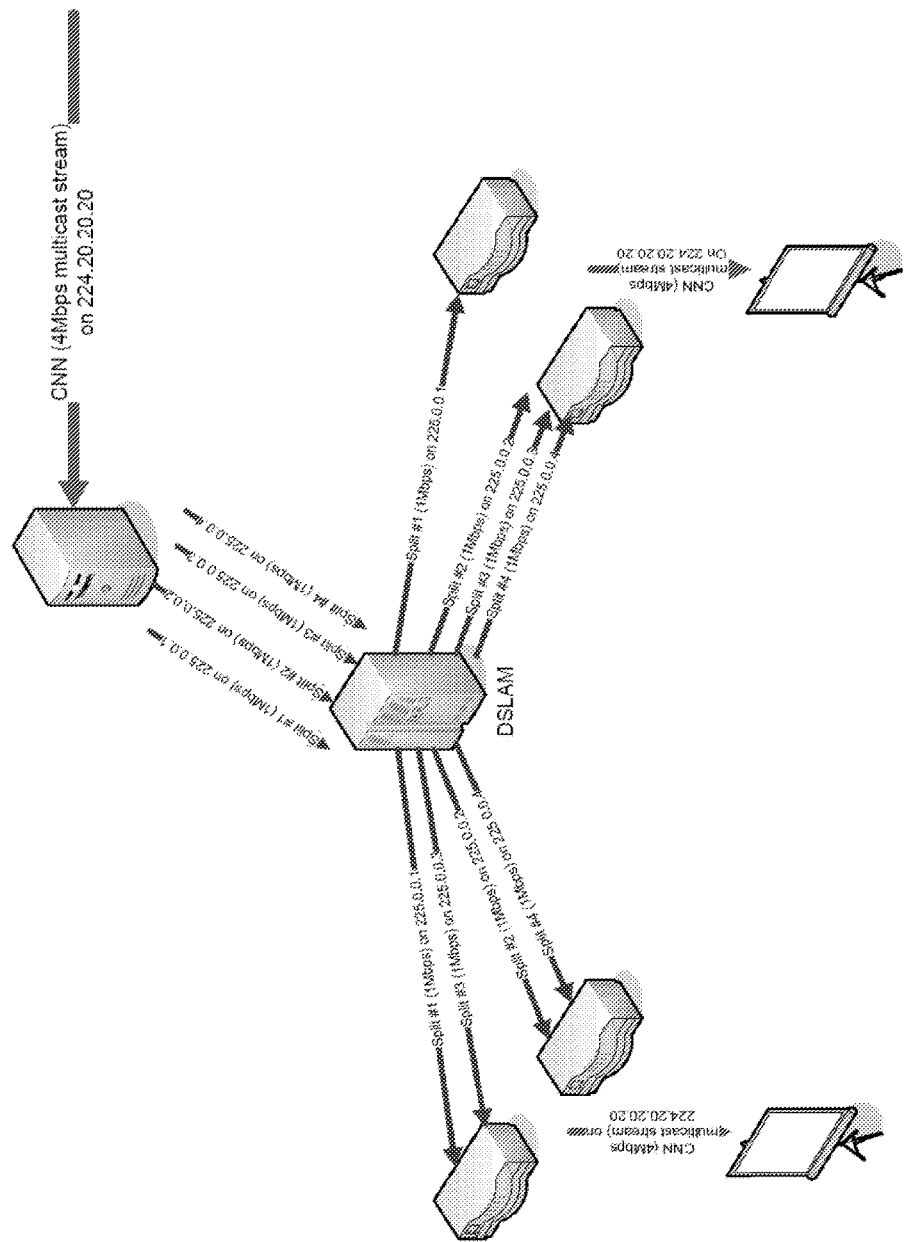
FIG. 2 illustrates multicast stream splitting for use by bonded broadband solutions.

FIG. 2 illustrates a multicast splitter server (MSS) 20 which subscribes to a multicast stream, such as the Cable News Network (CNN) multicast video stream, 21. The MSS splits the received stream 21, which in this case is a 4 MbpS stream into four multicast sub-streams 22a, 22b, 22c, 22d, each of 1 Mbps. Each of the sub-streams is sent on a different IP multicast address—225.0.0.1 to 225.0.0.4 in this example. The multicast sub-streams 22a, 22b, 22c, 22d traverse the network in the same way as any other multicast traffic via the Digital Subscriber Line Access Multiplexer (DLSAM) 25.

In the embodiment illustrated in FIG. 2, Customer 23 has 2 DSL lines, both of roughly the same speed. In this case bonding router 23a would subscribe to half of the multicast sub-streams for example multicast addresses 225.0.0.1 and 225.0.0.3 and bonding router 23b would subscribe to the remaining multicast sub-streams, for example multicast addresses 225.0.0.2 and 225.0.0.4.

Customer 24 has two DSL lines but one is running at 1 Mbps with the other at 3 Mbps. In this case router 24a would subscribe to a quarter of the multicast sub-streams for example multicast address 225.0.0.1, with router 24b subscribing to the remaining multicast sub-streams 225.0.0.2, .3 and .4.

In the event that a customer has more than one connection, but not all of them support multicast then it is possible to create a hybrid solution where the connections that support multicast subscribe to a proportion of the sub-streams and the connections that do not support multicast are arranged to receive a unicast version of a proportion of the sub-streams.

Each sub-stream will only traverse the network once, hence retaining the efficiency of the network layer multicast.

As mentioned previously there is a trade-off between the number of multicast sub-streams against the efficient use of available capacity on the customer lines.

Splitting each IP multicast stream into between 16 and 32 sub-streams will usually provide sufficient granularity.

The MSS 20 examines the multicast stream and splits it into a number of multicast sub-streams. Only the destination IP address changes—the remainder of the packet (including QoS tagging) will remains unchanged.

There are a number of different way on which the splitting may be achieved, the particular method used for a particular multicast stream is specified by the NOC 17.

Figure 3:
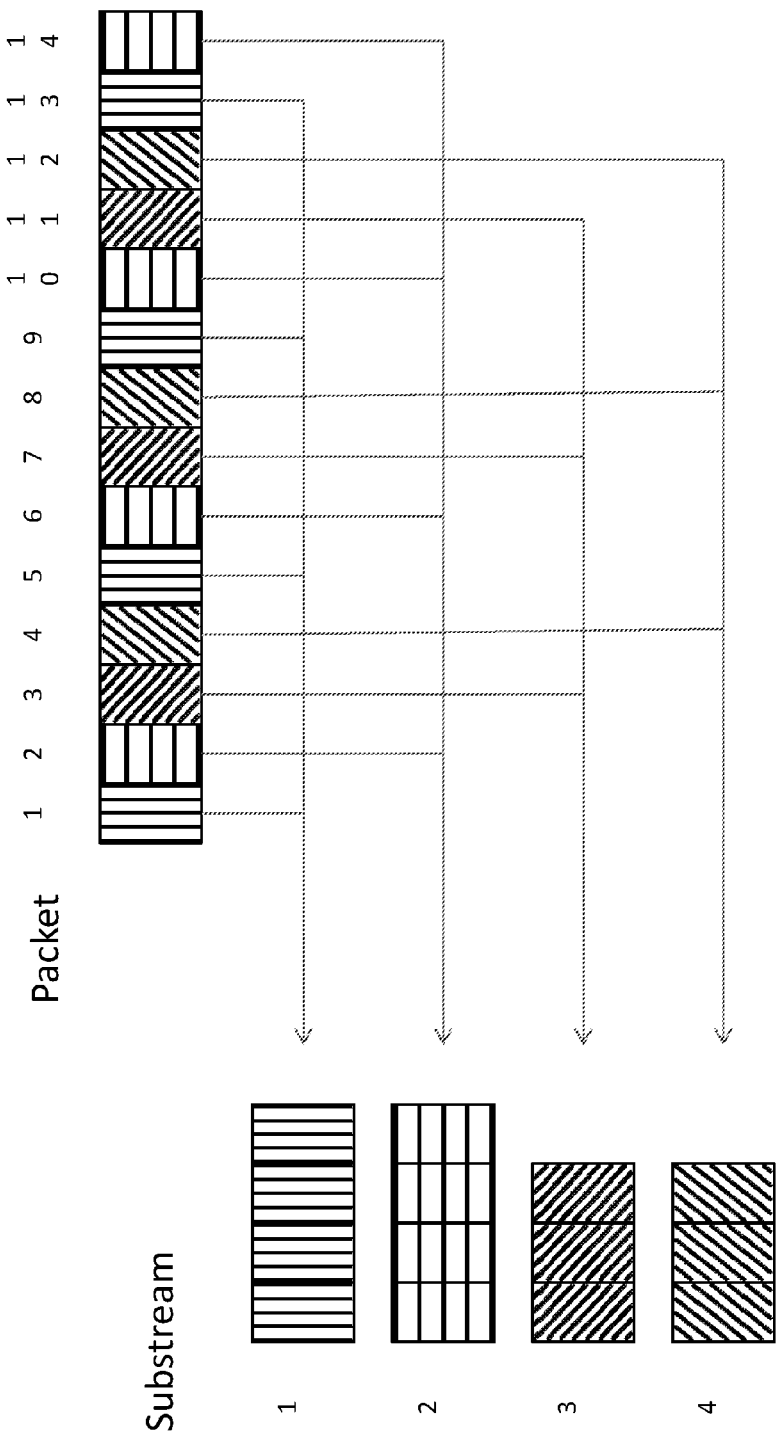
FIG. 3 illustrates stream splitting using an equal or 'round robin' algorithm.

FIG. 3 illustrates a first method by which the multicast stream may be split into substreams. FIG. 3 illustrates four substreams. The splitting may be done using a simple round-robin algorithm to distribute the packets between N substreams, where packet 1 goes out on substream 1, packet 2 on substream 2 and so forth until n=N where packet N+1 goes out on substream 1, packet N+2 on substream 2 and so forth until n=2N etc If the substreams are numbered from 0 and there are N substreams then a simple algorithm can route packet n to substream (n mod N).

Figure 4:
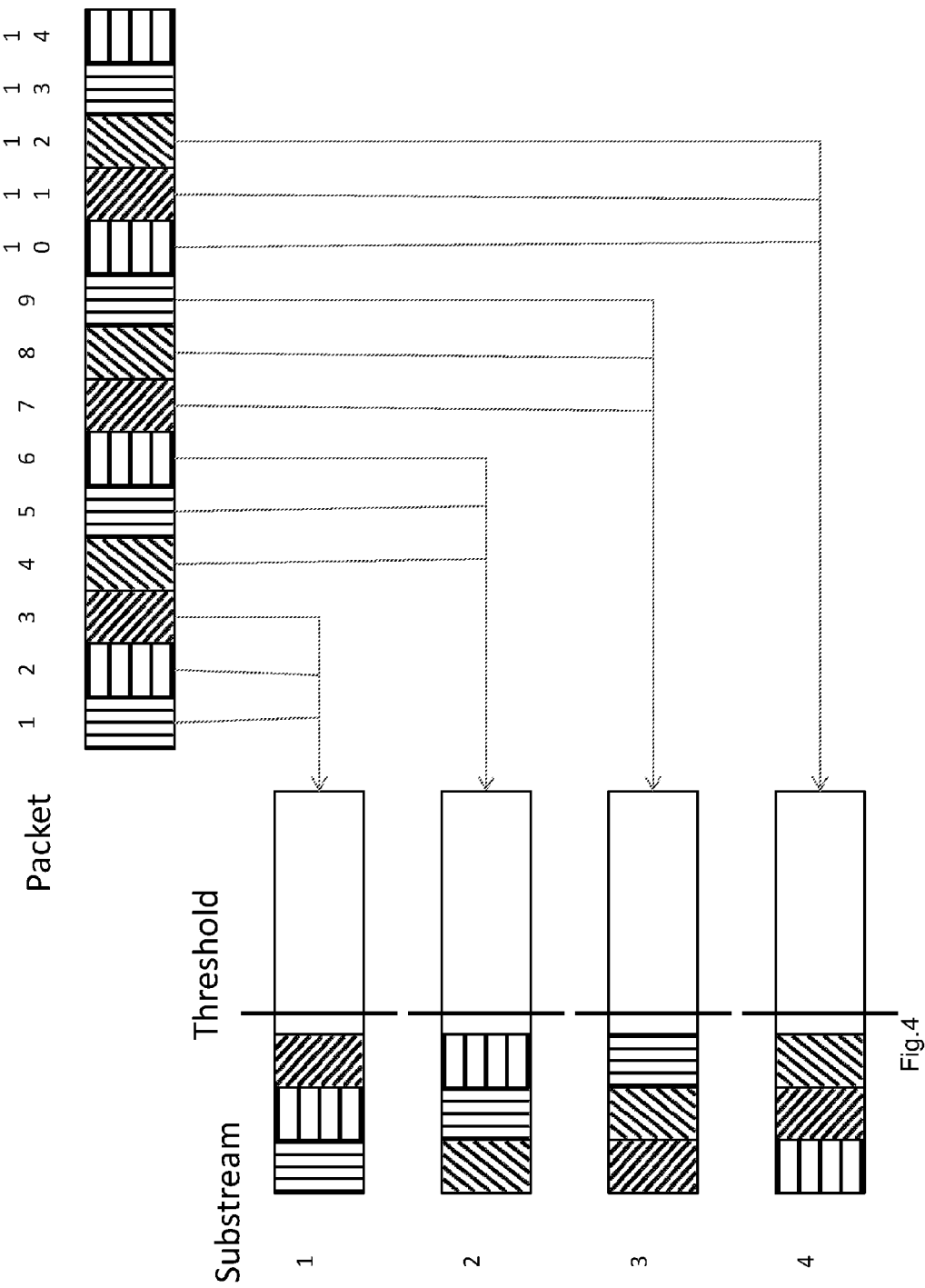
FIG. 4 illustrates stream splitting using an algorithm based on thresholds.

In an alternative embodiment packets illustrated in FIG. 4 packets are sent to one substream until a threshold would be exceeded when the next packet is received. The threshold could alternatively be set so that the packets are sent to the next substream after the threshold has already been exceeded.

This may be a convenient technique for codecs where many small packets are sent, packets are sent on a substream until a certain number of bytes had been sent. For example if a codec consistently produces packets of 400 bytes and the threshold is set to 1400 bytes, an average of 3 packets will be sent over each substream at a time as illustrated in FIG. 4.

Figure 5:
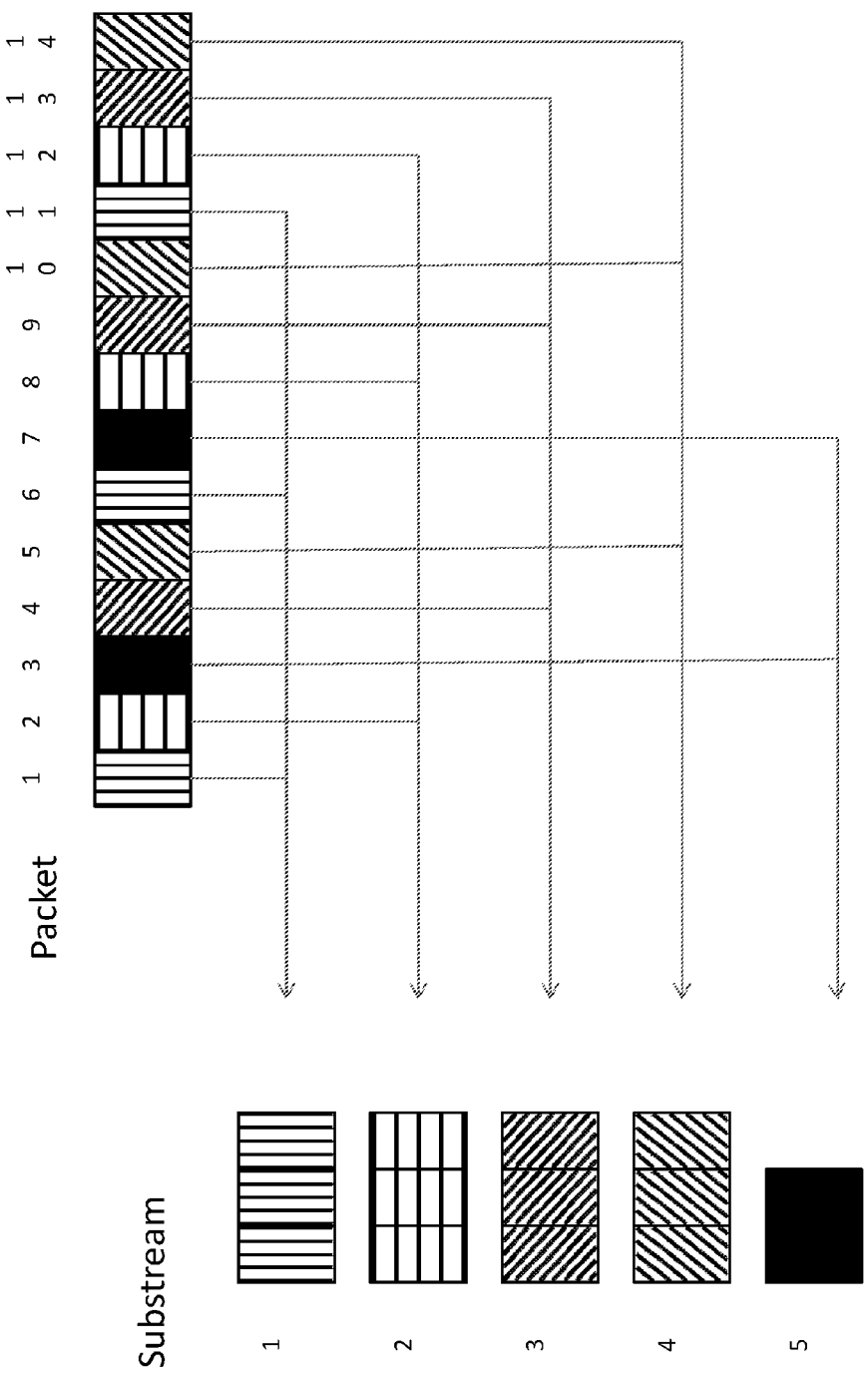
FIG. 5 illustrates stream splitting using selective algorithm using key-frames in combination with a round robin algorithm.

In another embodiment illustrated in FIG. 5 certain keyframes (for example packets 3 and 7) are sent over a selected substream (for example substream 5). All non-keyframes are sent across the remainder of the sub-stream groups. This scheme may be combined with either of the other schemes mentioned previously. In FIG. 5 selective routing of keyframes is shown in combination with round robin (or equal) routing of the remaining non-keyframe packets. The most reliable networks links can advantageously subscribe to the substream containing the key frames.

There are a number of ways of making the decision on which routers subscribe to which multicast sub-streams. In one embodiment the aggregation server makes the decision and notifies the routers. Where there are more than one bonding routers the bonding router designated as the default gateway makes a decision and notifies the other routers. In a third embodiment a deterministic algorithm is used to make the decision.

The MSS 20 periodically (in the preferred embodiment this is done once per second) sends a list of multicast streams which are currently being processed, and details on the sub-streams into which each multicast stream has been split.

Using FIG. 2 as an example, the MSS 20 will send a message comprising a multicast announcement to the bonding routers as follows:
CNN 4 Mbps video stream
Original IP multicast group 224.20.20.20
Split into 4 sub-streams
Sub-streams are using IP multicast addresses 225.0.0.1, 225.0.0.2, 225.0.0.3 and 225.0.0.4.

When the bonding routers sees an IGMP join message for multicast group 20 (224.20.20.20), instead of subscribing to that IP Multicast group they will instead subscribe to the IP addresses for the sub-streams 22a. 22b. 22c. 22d. The bonding routers will each subscribe to a proportion of the sub-streams. Other joining protocols may equally well be used, for example User Datagram Protocol (UDP), Hypertext Transfer Protocol (HTTP) or another suitable signalling protocol.

It is possible to amend the system so that multicast group joins/leaves are determined by some protocol other than IGMP using an Application Programmers Interface (API) on the NOC 17.

The announcement may also specify which methodology the bonding routers should adopt when subscribing to the sub-streams.

In one embodiment, the bonding routers subscribe to all the multicast sub-streams between them, even if there is insufficient bandwidth to do so ie all of the streams are joined and it is 'pot luck' which packets are actually received given there is insufficient bandwidth available.

In another embodiment each router joins sequential groups of multicast sub-streams. For example router 1 may subscribe to sub-streams 1 to 16, and router 2 subscribes to sub-streams 17 to 32.

In another embodiment each router will join non-sequential sub-streams wherever possible. For example router 1 may join all odd numbered sub-streams and router 2 may join all even numbered sub-streams. This should improve video quality in event of packet loss on a single DSL line because most codecs respond better to packet loss if non sequential packets are lost, for example if packets 1,3,5,7 are received a codec is likely to produce a better quality result than if packets 1,2,5,6 are received.

If the selective splitting method as been used to split the multicast stream into substreams then certain sub-stream(s) will contain all keyframes, with the other sub-streams containing only non-keyframes. The available customer router (s) should subscribe to all key frames. If after the keyframe sub-streams have been subscribed to and there is still some excess capacity, a certain number of non-keyframe sub-streams will be subscribed to.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognised that various alterations, modifications, and/or additions may be introduced into the constructions and arrangements of parts described above without departing from the invention as defined in the following claims.

The invention claimed is:

1. A communication network comprising
a plurality of routers having the ability to route multicast streams:
a multicast stream splitter receiving a multicast stream and arranged in operation to split said multicast stream into a plurality of multicast sub-streams and to transmit said plurality of multicast streams;
said plurality of routers receiving said multicast sub-streams and replicating said sub-streams in dependence upon downstream routers subscribed to said sub-streams;
a plurality of bonding routers serving a single customer, each of said plurality of bonding routers serving a plurality of fixed or wireless broadband connections having a respective capacity, each bonding router subscribing to one or more of said plurality of multicast sub-streams in dependence upon the respective capacity of the plurality of connections;
wherein the plurality of bonding routers serving a single customer aggregate said plurality of multicast sub-streams to form a single multicast stream for use by said customer,
wherein said plurality of bonding routers are arranged to subscribe to one or more of said plurality of multicast sub-streams in response to a message from the multicast stream splitter and in which the multicast stream splitter determines which bonding router subscribes to which one or more sub-streams in dependence upon the relative speed of the connections served by each bonding router and in which the message determines the bonding routers should subscribe to sequential multi cast sub streams; and wherein the message determines that the plurality of bonding routers should subscribe to sequential multicast sub-streams.

2. The communication network according to claim 1, wherein said multicast stream splitter is arranged to split the received multicast stream into a plurality of sub-streams by allocating received packets to sub-streams sequentially on a round robin basis.

3. The communication network according to claim 1, wherein said multicast stream splitter is arranged to split the received multicast stream into a plurality of sub-streams by allocating received packets to each sub-stream in turn until a respective threshold has been met for the sub-stream currently having packets allocated.

4. The communication network according to claim 1, wherein said multicast stream splitter is arranged to allocate keyframe packets to a particular sub-stream.

5. The communication network according to claim 1, wherein in the event a bonding router is unable to receive a plurality of multicast sub-streams, the bonding router is arranged to receive a unicast version of the plurality of multicast sub-streams to which it is subscribed.

6. A communication network comprising
a plurality of routers configured to route multicast streams:
a multicast stream splitter configured for receiving a multicast stream and further configured to split said multicast stream into a plurality of multicast sub-streams and to transmit said plurality of multicast sub-streams;
said plurality of routers configured for receiving said multicast sub-streams and replicating said multicast sub-streams in dependence upon downstream routers subscribed to said multicast sub-streams;
a plurality of bonding routers serving a single customer, each of said plurality of bonding routers serving a plurality of fixed or wireless broadband connections having a respective capacity, each of said plurality of bonding routers subscribing to one or more of said plurality of multicast sub-streams in dependence upon the respective capacity of the plurality of connections;
wherein the plurality of bonding routers serving a single customer aggregate said plurality of multicast sub-streams to form a single multicast stream for use by said customer;
wherein said plurality of bonding routers are arranged to subscribe to one or more of said plurality of multicast sub-streams in response to a message from the multicast stream splitter, and wherein the multicast stream splitter determines which bonding router of said plurality of bonding routers subscribes to which one or more sub-streams in dependence upon the relative speed of the connections served by each of said plurality of bonding routers; and
wherein the message determines that the plurality of bonding routers should subscribe to non-sequential multicast sub-streams.

7. The communication network according to claim 6, wherein said multicast stream splitter is arranged to split the received multicast stream into a plurality of sub-streams by allocating received packets to sub-streams sequentially on a round robin basis.

8. The communication network according to claim 6, wherein said multicast stream splitter is arranged to split the received multicast stream into a plurality of sub-streams by allocating received packets to each sub-stream in turn until a respective threshold has been met for the sub-stream currently having packets allocated.

9. The communication network according to claim 6, wherein said multicast stream splitter is arranged to allocate keyframe packets to a particular sub-stream.

10. The communication network according to claim 6, wherein in the event a bonding router is unable to receive a plurality of multicast sub-streams, the bonding router is configured to receive a unicast version of the plurality of multicast sub-streams to which it is subscribed.

* * * * *